United States Patent [19]

Hwang

[11] Patent Number: 4,954,806
[45] Date of Patent: Sep. 4, 1990

[54] WARNING DEVICE FOR THE INADEQUATE TIRE AIR PRESSURE

[76] Inventor: Feng-Lin Hwang, No. 21, Pa Te Rd., Chi Tu District, Keelung City, Taiwan

[21] Appl. No.: 466,191

[22] Filed: Jan. 17, 1990

[51] Int. Cl.$^5$ .............................................. B60C 23/00
[52] U.S. Cl. ................................... 340/442; 73/146.5; 73/146.8; 200/61.22; 116/34 R
[58] Field of Search ............ 340/442; 73/146.8, 146.5, 73/146.4; 200/61.22; 116/34 R, 34 A, 34 B

[56] References Cited

U.S. PATENT DOCUMENTS

| | | | |
|---|---|---|---|
| 3,938,078 | 2/1976 | Davis et al. | 340/442 |
| 4,726,223 | 2/1988 | Huang | 73/146.8 |
| 4,783,993 | 11/1988 | Lothar et al. | 73/146.5 |
| 4,814,745 | 3/1989 | Wang | 340/442 |

Primary Examiner—Donnie L. Crosland
Attorney, Agent, or Firm—Browdy and Neimark

[57] ABSTRACT

A warning device for the inadequate tire air pressure, includes an outer shell which includes all assembly members and can be screwed to a tire's air valve; an operating needle plate which acts to operate and open the tire valve as the outer shell is screwed thereto; a resilient hood undertaking a compression from the tire air pressure; a switch bar which moves along with the resilient hood under compression; and a PC board with the warning sounds and lights circuit. As screwedly mounted to each tire valve of a vehicle's, this device because of function of the operating needle plate can allow air communication and thus make the air pressure in the resilient hood outer front area equal to tire's regulated air pressure, and that acts resilient hood to move the switch bar which then causes the warning sounds and lights circuit to be open circuit. Once the tire air pressure reduces below predetermined standard, the reduced air pressure acts less to resilient hood and the switch bar moves back to make contact with the circuit to generate sounds and lights warning.

1 Claim, 1 Drawing Sheet

WARNING DEVICE FOR THE INADEQUATE TIRE AIR PRESSURE

FIELD OF THE INVENTION

This invention relates to a warning device for the inadequate tire air pressure, and particularly to a kind of device which can emit sounds and lights on its own when the tire air pressure happens to reduce below a predetermined standard. This way driver could be earlier warned of his problematic tire to take action before it is further abnormally worn to bring an accident easily.

BACKGROUND OF THE INVENTION

Before starting to drive and during rest time, most drivers tend to give their visual inspection to the tires they use to make sure whether they are screwed securely and presented well with filled air pressure. Kicking them is sometimes done to get further assurance about their air pressure. Nonetheless, whether they are filled with adequate air pressure remains unknown. As we all are aware, if a tire with insufficient air pressure is used, it is expected to experience abnormal wearing and even breakage. So, solving this problem is really needed.

OBJECTS OF THE INVENTION

In view of the problem above-described, this invention provides a warning device for the inadequate tire air pressure which will automatically generate sounds and lights when the tire's internal air pressure reduces below a predetermined standard to warn the driver of his tire problem to deal with.

SUMMARY OF THE INVENTION

A warning device for the inadequate tire air pressure comprises an outer shell which can be screwedly mounted to a tire's air valve; an operating needle which acts to operate and open the tire valve's air stopper; a resilient hood which undertakes a compression from the tire's air pressure; a switch bar which moves along with the resilient hood under compression; and a PC board with the structure of sounds and lights circuit. As screwed to a tire valve, the outer shell, because of function of the operating needle, will soon communicate with the associated tire's air pressure via its tire valve, making the outer front area of resilient hood undertake the compression and therefore move the switch bar to render to be open the warning sounds and lights circuit of PC board. Once the tire air pressure reduces below a predetermined standard, the resilient hood will be less compressed and thus moves back switch bar somewhat to cause the PC board circuit to be conducted open to send warning sounds and lights.

SPECIFIC DESCRIPTION

Figure 1:
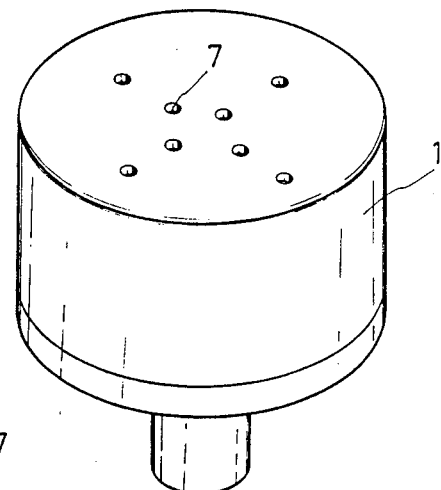
FIG. 1 is a perspective view of a preferred embodiment according to the invention.
Figure 2:
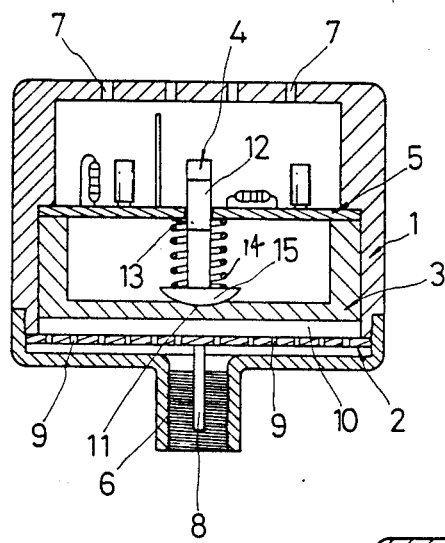
FIG. 2 is an elevational view in cross-section of the device shown in FIG. 1.
Figure 3:
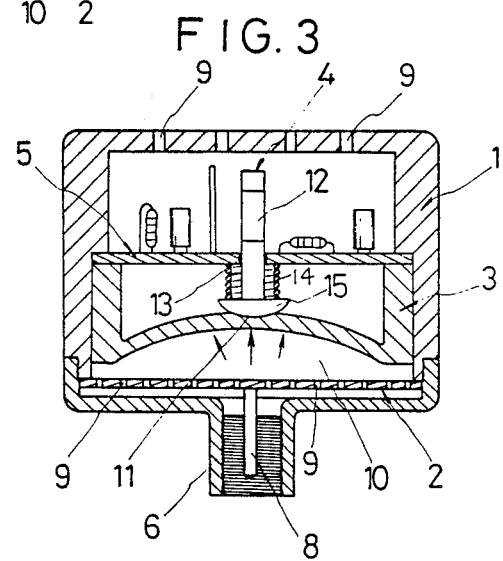
FIG. 3 is an elevational view in cross-section of the device shown in FIG. 1 in an in-use state.

As FIGS. 1, 2, this invention comprises: outer shell 1, operating needle plate 2, resilient hood 3, switch bar 4 and PC board 5. The outer shell 1 is a hollow barrel which has an end of threaded tube 6 to screw to the tire air valve and the other end where there is a plurality of pores 7 for transmitting sounds and lights. In a placed order from threaded tube 6 to the interior of outer shell, there are provided operating needle plate 2, resilient hood 3, switch bar 4 and PC board 5. Wherein operating needle plate 2 is a circular sheet with an operating needle 8 at the center thereof extending perpendicular to the plate plane and cut with a few small holes 9 to allow air to run therethrough. As the threaded tube 6 of outer shell 1 screws to a tire valve (not shown), operating needle 8 will soon push aside the valve's air stopper and open the valve to allow air communication from the tire to an air chamber 10 just in front of resilient hood 3, in which situation resilient hood 3 undertakes a compression from the air pressure equal to that tire's. The resilient hood 3 has appropriate resilience and closely contacts against the outer shell inner wall to be airtight, and is provided with a concave means 11 in the central part thereof for insertion by the tail part 15 of switch bar 4. Under the compression action by air pressure (as FIG. 3 shows), resilient hood 3 will go to be centrally concave toward the outer shell interior and bring switch bar 4 to move to separate its conductible portion 12 from contact with the central opening of PC board 5 where conductive circles 13 are installed, so the electric circuit is rendered to be open without any action to occur. Switch bar 4 is a screw bolt but has no thread and made by insulating material, and has a conductible portion 12 in some suitable area of the bar body upper part to pass the PC board's central opening where conductive circles 13 are provided; switch bar 4 is placed on concave means 11 with its tail part 15 securely connected thereto by means of spring 14 connecting the PC board 5 and the concave means 11. While conductible portion 12 contacts conductive circles 13, the circuit of PC board 5 is conducted open to generate warning sounds and lights. PC board 5 is circular of shape, and has an opening in the center thereof connected with conductive circles 13 that has switch control over the PC board circuit as switch bar 4 passes. Since structure of the warning sounds and lights circuit is as the generally used, more description about it is omitted.

In use, this device is screwedly mounted to the air valve of each vehicle tire. Because of the regulated standard set for tire air pressure, the conductible potion 12 of switch bar 4 would be moved to separate from conductive circles 13. Once the tire air pressure reduces below the standard, resilient hood 3 then undertakes less compression therefrom and moves rearward, in which situation spring 14 is allowed to extend to bring the conductible portion 12 to contact conductive circles 13 to generate warning sounds and lights.

I claim:

1. A warning device for the inadequate tire air pressure comprises:
    an outer shell, which is a hollow barrel with one end of a threaded tube to screw to a tire's air valve and with the other end where a plurality of pores are provided, wherein an operating needle plate, a resilient hood, a switch bar and a PC board are placed in an order from the threaded tube toward the outer shell interior;
    an operating needle plate, which is a circular sheet with a few small holes thereon and an operating needle at the center thereof extending perpendicular to the plate's plane, can push aside a tire's air stopper to allow air communication from the tire to an air chamber just in front of resilient hood when screwed to a tire valve;

a resilient hood, which has appropriate resilience and closely contacts the inner wall of said outer shell to e airtight, and has a concave means in the central part thereof for insertion by the tail part of switch bar;

a switch bar which is a screw bolt but has no thread and made by insulating material, and has a conductible portion in some suitable area of the bar body upper part to pass PC board's central opening where conductive circles are installed; the switch bar being placed on a concave means of resilient hood with its tail part securely connected thereto by means of a spring connection between the PC board and concave means;

a PC board, which is circular of shape and has an opening in the center thereof where conductive circles are installed for said switch bar to pass to contact or separate from them in switch control of the PC board circuit; with the above-described elements, this device if screwed to a tire valve is expected to send warning sounds and lights when the tire air pressure happens to reduce below the regulated standard.

* * * * *